[11] 3,580,092

[72] Inventor Thoma...
Edison, N.J.
[21] Appl. No. 887,505
[22] Filed Dec. 23, 1969
[45] Patented May 25, 1971
[73] Assignee Scarpa Laboratories, Inc.

[54] ACOUSTIC FLOWMETER
21 Claims, 7 Drawing Figs.
[52] U.S. Cl.................................................... 73/194,
340/239, 340/261
[51] Int. Cl..................................................... G01f 1/00
[50] Field of Search............................................73/194 (A),
194 (VIB), 194 (E); 340/239, 261

[56] References Cited
UNITED STATES PATENTS
2,936,619  5/1960  Gibney.......................... 73/194
3,068,694  12/1962  Worswick...................... 73/194
...a et al. ................. 73/194

Primary Examiner—Charles A. Ruehl
Attorney—Martha G. Pugh

ABSTRACT: A clamp-on flowmeter having a pickup element designed to be removably secured on an external surface of a pipe, which is responsive to ultrasonic radiation generated by shear action of fluid flowing in the pipe. The signal from the pickup element is filtered, frequency-selectively amplified, and integrated, the output being used to operate indicating means, and various types of relay-actuated devices. In one embodiment, the pickup element is a piezoelectric wafer; and the response characteristic for the overall circuit including the pickup element is designed to be fairly uniform over a broad range of frequencies extending from just above the audio range to at least about 100 kilocycles. In a modification of this, the pickup element is designed to respond to a relatively narrow band of frequencies well above the audio range, to which band the amplifier-integrator circuit is specifically tuned.

PATENTED MAY25 1971 3,580,092

INVENTOR
THOMAS J. SCARPA
BY Martha L Pugh
ATTORNEY

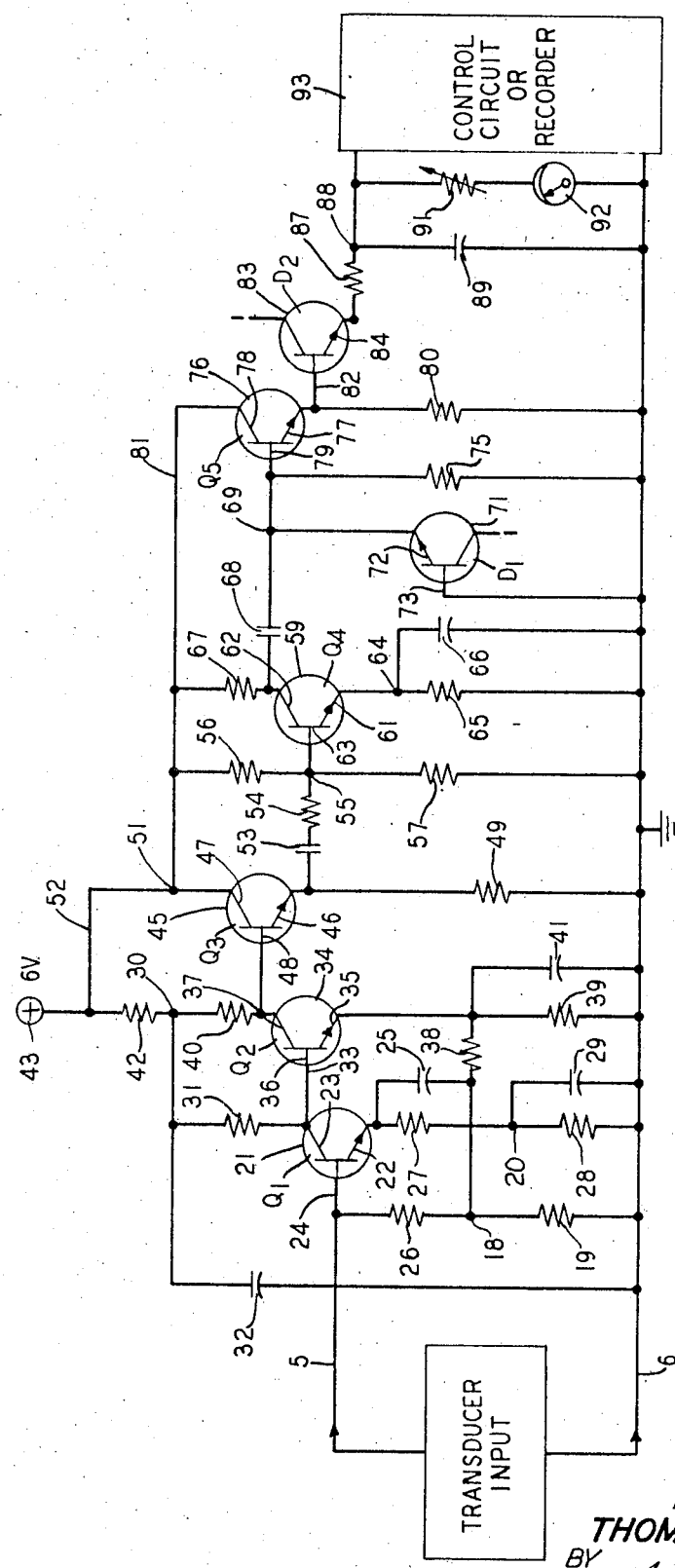

3,580,092

ACOUSTIC FLOWMETER

BACKGROUND OF THE INVENTION

This invention relates in general to methods and apparatus for monitoring fluid flow in a pipe; and more particularly, to devices of an electroacoustic type which are responsive to noises generated by the shearing action of fluid flowing in a pipe.

In the case of both mechanical and electronic flowmeters of the types known and used in the prior art, one or more foreign elements is necessarily interposed in the path of the fluid whose flow is to be monitored. This has the disadvantage of distorting the flow one wishes to measure; and the further disadvantage of necessitating the opening up of the pipe section to be monitored, prior to the monitoring operation, and either inserting the necessary functional elements or an additional pipe section, containing these elements, into the pipe system, which must then be resealed. Such an arrangement is more or less costly, and quite inflexible for making flow measurements on a complex pipe system. Moreover, it is also less than satisfactory for monitoring the flow of gas or liquid from a system which has many outlets, or which involves many containers which are quickly emptied, requiring the installation of a flowmeter in a more or less permanent fashion at each outlet.

Moreover, many of the electroacoustic types of flowmeters now known in the art have the further disadvantage of requiring a complex, and therefore expensive, circuit designed to both transmit and receive radiant energy.

Accordingly, a principal object of the present invention is to provide an improved flow monitoring device which may be simply removably clamped on to a selected pipe section for monitoring the fluid flow, without cutting or interposing elements in the pipe, or maintaining permanent installations on the pipe. Another object of the invention is to provide a flow monitoring device which is adaptable to many different types of installations without precalibration. Other objects of the invention are to provide a device of the type described which is simpler, less complex, and therefore, less expensive than the devices of the prior art.

SHORT DESCRIPTION OF THE INVENTION

These and other objects are realized in accordance with the present invention in a flow monitoring device including a clamp-on transducer which is readily applied in a removable fashion to the external surface of the pipe in which flow is to be monitored; and which is responsive to the noise generated by the shearing action of the fluid as it passes along the pipe. The signal received by the clamped on transducer is passed into a circuit which is designed to filter out spurious responses, and selectively amplify and integrate the flow generated response, producing an electrical output which is a preselected function of the fluid flow in the pipe of gas, liquid, slurry or dry powders. The output signal is connected to operate recording and/or indicating means, and may also energize one or more relays to perform desired functions, such as on-off control of the fluid flow in said pipe, actuation of safety devices, etc.

In accordance with a particular embodiment of the invention, the clamp-on sensing transducer comprises a piezoelectric crystal element having a broad-band response extending from the audio range up to at least about 100 kilocycles. The transducer output is passed through amplifier and integrator means having an overall response characteristic in which the low frequency cutoff point is just above the upper limit of the audio range, and rises sharply for frequencies above the audio range to a more or less uniform response plateau which extends up to at least about 100 kilocycles, above which it may drop off sharply. This is achieved by passing the transducer output through several stages of amplification which are designed to impose a negative feedback which is degenerative for low frequencies which may include spurious responses. The circuit includes several stages of high-pass filtering which further discriminate between the desired flow-generated signals in the above audio range, and the lower frequency spurious signals. The positive components of the signal are further amplified and integrated in a capacitor coupled to a series resistor which provides a long charging time, unresponsive to transients. The output current, which varies roughly as the inverse square of the fluid flow, actuates an indicator, and is also utilized to drive a relay or to operate a motor, which may operate recording means designed to register the rate and volume of the flow, or alternatively, equipment designed to turn the flow on and off, to record the time of flow, operate safety devices, etc.

In accordance with an alternative form of the invention, the piezoelectric clamp-on, pickup device is designed to respond sharply to a narrow band of frequencies anywhere within the range, say, between 10 to well above 100 kilocycles, rather than a broad range of frequencies, as in the preferred embodiment. In this latter case, the detecting circuit may consist of a single tuned circuit, rather than the frequency-selective amplifier and integrator circuit of the preferred embodiment.

The clamp-on flow monitor of the present invention has the advantage that the operating elements may be temporarily clamped or affixed to a selected pipe section. There is no necessity for cutting open the pipe, or interposing a pipe section to place the operative elements in the pipe system in position to detect the flow. Because of this, flow measurements are not distorted by the presence of foreign elements in the pipe. Furthermore, the flow monitor of the present invention is constructed to indicate relative flow velocities in numerous different types of installations and including a broad range of fluids, without precalibration. Moreover, the clamp-on device may readily be applied to measure the flow at any desired point in a complex pipe system. Furthermore, the clamp-on flow monitor of the present invention is simple and inexpensive to fabricate, due to the fact that it includes only a receiving circuit, without cumbersome transmitting or pulse generating means. Since the output current or voltage across the output varies substantially as the inverse square of the fluid flow, a watt meter connected across the output gives a response which is substantially a linear function of the volume fluid flow in the pipe.

Using the circuit of the preferred embodiment, it has been found that input signals as faint as 5 microvolts, having a signal-to-noise ratio as low as 10-to-1 have been suitably detected, amplified, and recorded.

Other objects, features, and advantages of the invention will appear to those skilled in the art, upon studying the specification hereinafter with reference to the attached drawings.

SHORT DESCRIPTION OF THE DRAWINGS

FIG. 6 is the schematic diagram of one embodiment of a circuit in accordance with the present invention for selectively amplifying, filtering, integrating, and utilizing the signals picked up by the clamp-on transducer.

Figure 1B:
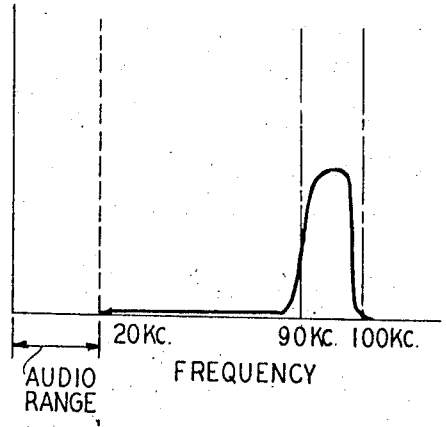
FIGS. 1A and 1B are graphical showings of alternative response patterns suitable for pickup circuits in accordance with the present invention.
Figure 1A:
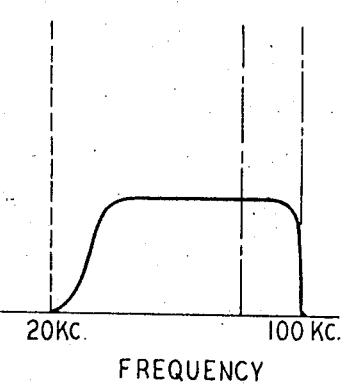

The clamp-on input element of the present invention is a high impedance crystal element which, in preferred arrangement, is designed to pickup signals generated throughout a broad spectrum of frequencies extending from the audio range to at least above 100 kilocycles by the shearing action of the fluid as it flows in the pipe. The pickup element attached to the pipe surface is connected to an amplifying and integrating circuit which responds to a range of transducer signals extending from just above the audio range, and which is thereby immune to spurious signals, but highly sensitive to the ultrasonic vibrations of the fluid shearing action. A typical profile of the output response for the circuit under description is shown in FIG. 1A of the drawings, which is a plot of microvolts against frequency, for the responsive range. The low cutoff may vary anywhere from 200 cycles per second to 40 kilocycles, at which point the response rises rapidly to substantially a plateau, which remains substantially constant up to 90 or 100 kilocycles, after which it falls off rapidly.

In an alternative circuit design, the pickup element is tuned to a selected narrow range of frequencies substantially above the audio range, say between 90 and 100 kilocycles; and the amplifier-integrator circuit is sharply tuned to this range. Such a response characteristic is shown in FIG. 1B. In this event, the receiving circuit can be a single tuned circuit, instead of a more complex circuit of the type indicated hereinafter. Such a circuit has been found to be operative, but not optimum, for the purposes of the present invention.

A preferable arrangement, using a pickup device having a broad, untuned operational characteristic of the type previously indicated, includes band-pass filters which are responsive to a wide range of frequencies, combined with electronic circuitry designed to discriminate against and bypass low frequency transients, and to amplify and integrate only the signal generated by the shearing action of the fluid.

Figure 2:
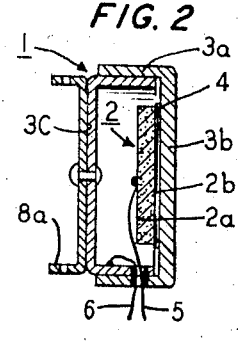
FIG. 2 shows in longitudinal section one embodiment of a clamp-on transducer unit in accordance with the present invention, in its housing.

Referring to FIG. 2 of the drawings, there is shown the high impedance crystal input device 1. This includes a piezoelectric crystal element of any of the types well known in the art, which is cut, or formed, and poled to vibrate in a thickness direction. This may comprise, for example, a ceramic wafer of lead zirconate titanate or, alternatively, a wafer of modified barium titanate, with a cobalt additive, known by the trade name "Channelite," manufactured by Channel Industries of California.

Such a wafer is treated, prior to mounting, in a manner well known to the art by applying an electric potential across the electrode contacts, through the wafer thickness, while heating it up to above the Curie temperature and subsequently cooling it again to room temperature. This process serves to pole the wafer for vibration in a principal thickness mode. Subsequently, it is aged in a well-known manner.

As previously indicated, the crystal wafer 2 is preferably designed to be responsive to signals generated throughout a broad spectrum by the shearing action of the test fluid flowing in a selected pipe section, a suitable range extending from audio up to, and at least exceeding, about 100 kilocycles. The crystal wafer 2 is designed to respond to signals as low as, say, 5 microvolts, caused by the shearing action of the fluid flowing in the pipe, the response characteristic being substantially uniform to beyond 100 kilocycles. In a preferred embodiment, the crystal wafer 2 has a diameter of one-half inch, and a thickness within the range 0.030 to 0.1 inch; but the broader thickness range may extend from 0.010 to 0.25 inches. This roughly corresponds to one-half the average wavelength in the selected frequency range.

The crystal wafer 2 has a pair of electrodes 2a and 2b applied to its opposite major surfaces, which may be, for example, layers of silver or other highly conductive metal evaporated or otherwise applied to the surface to a thickness of a few mils. This assemblage is mounted in a housing 3a, 3b. This may take the form of, for example, a cuplike container 3a having an inside diameter which slightly exceeds that of the crystal wafer 2. Container 3a may comprise any material having a good coefficient of conductivity for acoustic waves, such as, for example, aluminum, titanium, stainless steel, brass, the alloy known by the trade name "Monel" or, alternatively, any nonmetallic solids having similar properties, such as polystyrene, acrylonitrile-butadiene-styrene, or those known by the trade names "Nylon" and "Teflon."

In the present illustrative embodiment, the cup 3a is aluminum, with a baseplate 3b, which has an inner diameter of, say eleven-sixteenths inches and a noncritical thickness of from zero to several inches, which may be, say, one thirty-second inches in the illustrative embodiment of FIG. 2. To accommodate the crystal wafer 2, the interior of baseplate 3b may have a slight concentric recess several thousandths of an inch deep, into which the crystal wafer is bonded. Prior to bonding, the mating surface of crystal element 2 is cleaned by exposing it to ultrasonic action in a container of isopropyl alcohol or acetone, or similar volatile solvent at, say, 40 kilocycles for about 10 minutes. The baseplate 3b is similarly exposed to ultrasonic cleaning in a bath of a tepid water. Subsequently, the crystal mating surface may be etched in a 10 percent to 20 percent solution of hydrochloric acid, or similar etchant, until water under the open top will completely wet the surface.

Crystal wafer 2 is mounted with its electrode surface 2b in contact with the recess in the inner bottom surface of baseplate 3b, to which it is bonded by a coating 4 of epoxy, or similar bonding agent having good acoustical transmission characteristics. In a preferred embodiment, the electrode layer 2b may be omitted; and the epoxy bonding agent is mixed with conductive material, such as, for example, silver paste, so that the under surface of the electrode 2b may be grounded to the baseplate 3b of cup-shaped housing 3a. The cylindrical walls of the cup 3a, which may be, say, about one-sixteenth inch thick, are either integral with the base, or welded or otherwise secured to it, extend outwardly about five-sixteenth inch in a direction perpendicular to the baseplate 3b. The cylindrical outer edge of the housing 3a is closed by a lid 3c, preferably of the same material as the container 3a, and of similar thickness, having an outer diameter about eleven-sixteenths inches, so it just fits snugly inside the sidewalls of cup 3a. Lid 3c is preferably secured to the inner walls of container 3a in a fluidtight seal. A pair of lead wires 5 and 6 pass in hermetically sealed conduits through an opening in the cylindrical wall 3a, making contact at their inner ends with the respective electrodes 2a and 2b.

Figure 4:
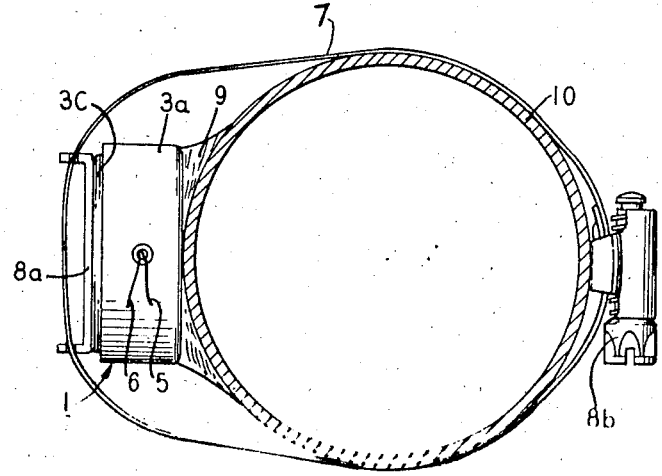
FIG. 4 shows a cross section through a pipe including an installed clamp-on transducer, in accordance with the present invention.
Figure 3:
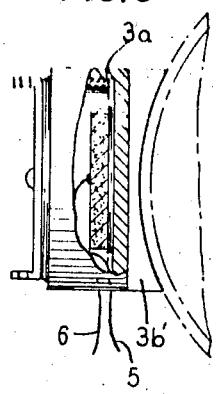
FIG. 3 shows in longitudinal section an alternative of the transducer unit of FIG. 2 having a modified housing.

The external bottom surface of the baseplate 3b may be slightly cylindrical in form, as shown in FIG. 3, or, alternatively, may have a thick undercoating 9 of silicone putty, epoxy or other similar additive, as shown in FIG. 4, to provide ultrasonic conducting contact with the outer cylindrical periphery of a pipe section 10 in which the rate of fluid flow is to be measured. In any case, the crystal assembly 1, in the housing, is secured in acoustic contact with the exterior of the pipe section 10 by means of a stainless steel hose clamp 7. The latter is designed to pass through a guide 8a, welded or riveted to the top 3c of the housing, as shown in FIG. 4. The steel strap comprised in hose clamp 7 has spaced apart along its length a plurality of parallel laterally extending slits. One or more of these slits are designed to be engaged by a worm wheel 8b, which operates to hold the base of housing 3b in tight ultrasonic energy translating contact with the surface of the pipe whose fluid flow is to be monitored.

Figure 5:
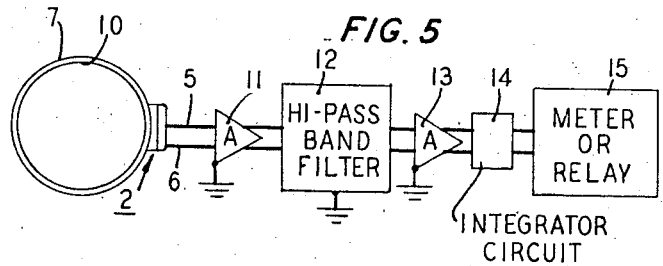
FIG. 5 shows a generalized block diagram circuit schematic in accordance with the present invention.

The leads 5 and 6 are connected to an amplifying and integrating circuit of the general configuration shown in FIG. 5 of the drawings. This may include, for example, a preamplifier circuit 11, including one or more stages, followed by a high pass filter stage 12, one or more final amplification stages 13, and an integrator circuit 14, the output from which is utilized to operate a meter or relay stage 15.

The foregoing circuit components may be of any types well known in the art.

One specific circuit arrangement in accordance with the present invention is disclosed in FIG. 6 of the drawings.

This comprises a first transistor amplifier stage which is designed to attenuate the low frequency spectral content of the crystal pickup, and amplify the high frequency components in two ways. These include, first, a boot strapping operation in which signals from the emitter of the first transistor are fed back through a relatively low capacitance to the bottom end of the input resistor to the base, thereby augmenting the impedance of that resistor at high frequencies. Thus, the input circuit is impedance-matched to the crystal for high frequencies and mismatched for low frequencies. Additionally, the emitter-biasing resistor is bypassed for high frequencies only; and serves to give degenerative feedback for the lower frequencies.

This first amplification stage includes the transistor triode 21, having an emitter contact 22, collector contact 23, and a base contact 24. This may be a transistor of one of the types well known in the art. In the present illustrative circuit, all five transistors and the two diode-connected transistors are NPN silicon types, more specifically of a type manufactured by General Electric Company under the Jedec designations 2N5172, or alternatively, 2N3391. It will be understood, of course, that PNP type resistors can be substituted for the disclosed NPN transistors, in which case, the circuit polarities are reversed, as is well known in the art.

Connected in series between the base electrode 24 and ground are the 10K ohm resistor 26, and the 22K ohm resistor 19, joined at point 18. Emitter 22 is connected through the 120 ohm resistor 27 in series with the 4.3K ohm resistor 28, to ground. Resistor 28 is bypassed by the 0.1 microfarad capacitor 29 connected between the junction 20 between resistors 27 and 28, and ground. Resistor 27 is bypassed by the 0.1 microfarad capacitor 25 connected between the emitter 22 and junction 18, between the two resistors of the base-to-ground circuit. The collector 23 is connected to a 6 volt direct current power source 43 through a circuit including the 22K ohm resistance 31, joined in series at junction 30 with the 330 ohm resistor 42. A 160 microfarad, 15 volt capacitor 32 is connected in parallel with transistor 21, across the input, between junction 30 and ground.

The collector 23 is connected through signal output lead 33 to the base electrode 36 of transistor 34, which functions to provide further amplification. The latter is an NPN type, similar to transistor 21. In addition to the base electrode 36, transistor 34 has an emitter electrode 35 and collector electrode 37. Emitter 35 is connected to ground through the 4.3K ohm resistor 39, bypassed between emitter and ground by the 200 microfarad, 10 volt capacitor 41. Emitter contact 35 is also connected through a feedback circuit to the first transistor stage through the 22K ohm resistor 38 to the negative plate of capacitor 25 at junction 18, between input resistors 26 and 19. Collector electrode 37 is connected through the 4.3K ohm resistor 40 to the junction 30, which is connected to the positive terminal of the 6 volt direct current power source 43, through the common resistor 42, previously described.

Collector 37 is directly coupled to the base 48 of transistor triode 45. The latter, which is an NPN transistor of a type similar to transistors 21 and 34, previously described, has a collector 47 connected through junction 51 and lead 52 to the positive terminal of direct current energizing source 43. This stage is connected in emitter-follower relation to the next stage, functioning as an impedance match to the latter. The emitter 46 is connected to ground through the 10 K ohm resistor 49.

Emitter 46 is connected through a high pass filter circuit, consisting of the 0.1 microfarad capacitor 53, in series with the 1K ohm resistor 54, which circuit serves to further discriminate against low frequencies. This filter is connected to junction 55 between the 220K ohm resistor 56, and the 47 K ohm resistor 57. Resistor 56 is connected at its other end through point 51 to the positive terminal of 6 volt DC power source 43; and resistor 57 is connected at its other end to ground.

Junction 55, as aforesaid, is connected to the base electrode 63 of the transistor triode 59, of a type similar to those previously described, having, in addition, an emitter electrode 61 and a collector electrode 62. The latter is connected to the junction 51 at the positive terminal of energizing source 43, through the 4.3K ohm resistor 67. Emitter 61 is connected to ground through the 470 ohm resistor 65, bypassed to ground by the 0.1 microfarad capacitor 66, which acts as an additional high pass filtering means.

Collector 62 is connected through 0.1 microfarad capacitor 68, which functions as a further high pass filter, to junction 69, which is connected to the base 79 of NPN type transistor 76, having, in addition, an emitter 77 and collector 78. Transistor 76 is operated with no bias, so that it is normally in a nonconducting state, serving, therefore, to pass only the positive-going portions of the signal applied to it.

The base 79 is connected to ground through diode-connected transistor 71. An NPN type, such as previously described, this transistor has its emitter 72 connected to junction 69, and the base 73 connected to ground. The 47K ohm resistor 75 is connected in parallel with diode 71 across the input to the base 79. The diode 71 functions as a direct current restorer to prevent a negative charge from building up on the capacitor 68.

The collector 78 of transistor 76 is connected through lead 81 to junction 51, directly to the positive terminal of the 6 volt direct current energizing source 43. Emitter 77 of transistor 76 is connected to ground through the 10K ohm resistor 80.

Direct connection is made, in emitter-follower fashion, from emitter 77 across resistor 80 to the base 82 of diode-connected transistor 83, in the final integrator stage of the circuit. Transistor 83 is an NPN type similar to those previously described. Emitter 84 of diode-connected transistor 83, is connected through the 100K ohm charging resistor 87 to the positive terminal of the 100 microfarad integrating capacitor 89, whose negative terminal is grounded, to charge the latter. The time constant of this circuit is chosen to give a relatively long charging time, which is unresponsive to transients. For example, a time constant for this circuit is preferably selected within the range between one-tenth second and 2 seconds, and may, in some cases, be as long as 10 seconds.

The final output circuit connected across the integrating capacitor 89 may comprise, for example, a variable resistor 91 having a maximum of, say, 5K ohms, in series with an indicating meter 92, which may be operative, say, over the range 0 to 50 microamperes. The slider of the variable resistor 91 can be set in initial calibration, so that the meter 92 operates over the desired range.

In addition, or alternatively, to the connection to the meter 92, the output between junction 88 and ground may be connected so that the output triggers a relay circuit 93, which may, for example, be connected to drive a recording device, a timer, microphone, alarm device, motor, etc.

The output current recorded in the meter 92 is roughly an inverse square law function of the velocity of flow of fluid in the pipe 1. If power, instead of current or voltage, is measured, the measured output varies inversely as a linear function of the volume flow. It has been found that when the circuit is designed to respond to a higher range of frequencies, the input signal is weaker, but the signal-to-noise ratio is higher, and better amplification results, since there are fewer spurious signals.

For many types of applications in which it is desired merely to monitor the onset or cessation of flow in a subject pipe and the general degree of flow, no precise calibration of the device is necessary. In other cases, where an accurate reading of flow rates is desired, the instrument is preferably calibrated after installation. In addition to operating conventional types of meters and/or recording devices, it will be apparent that the output current from the device described can be utilized to drive one or more relays, which are connected to actuate devices to control or turn off fluid flow in the pipe, or operate alarm or signal devices in a manner well known in the art.

It is conceivable that an altogether different type of pickup device, than the one specifically described, with reference to FIGS. 2 and 3, could be employed, such as, for example, a magnetostrictive device, or a magnetic pickup device.

Moreover, it will be apparent that in addition to the circuit shown in FIG. 6, which is merely illustrative of the principles of the present invention, there are many other types of circuit arrangements within the skill of the art, which are suitable for the purposes of the present invention.

I claim:

1. A device for monitoring fluid flow in a pipe which comprises in combination
    a transducer constructed to respond to at least a portion of the signals generated by the shearing action of said fluid flow within a broad spectrum of frequencies extending from the audio range to at least beyond 100 kilocycles,
    said transducer being mounted in a housing including means mechanically connected to said housing for coupling said transducer in ultrasonic transfer relation with an external surface of said pipe devoid of specialized fittings for said coupling,
    a circuit electrically coupled to derive an output signal from said transducer,
    said circuit including mans for frequency-selectively amplifying and filtering the output signal derived from said transducer within a preselected frequency range and bypassing signals below said range, and for integrating the steady state component of said signal while rejecting transient signals, and
    means connected to said circuit for utilizing the output current derived from said circuit.

2. The combination in accordance with claim 1 wherein the low frequency cutoff point of said preselected frequency range lies between 200 cycles per second and 40 kilocycles per second, and wherein the response characteristic of said circuit is a substantially uniform plateau between said low frequency cutoff point and a high frequency cutoff point of at least about 100 kilocycles.

3. The combination in accordance with claim 2 wherein said circuit includes:
    at least one preamplifier stage including means for selectively amplifying high frequency signals and bypassing low frequency signals,
    high pass band filtering means connected to said preamplifier stage,
    at least one additional amplifier stage connected to said filtering means for receiving and selectively amplifying the output of said filtering means by selecting the high frequencies and bypassing the low frequencies,
    and integrating means comprising a charging circuit, having a time constant between one-tenth second and 10 seconds constructed to receive and integrate the steady response from said last-named amplifying means and to reject the transients.

4. The combination in accordance with claim 3 wherein said charging circuit has a time constant of between one-half second and 2 seconds.

5. The combination in accordance with claim 3 wherein the voltage output of said integrating circuit is substantially an inverse square function of the rate of fluid flow in said pipe section.

6. The combination in accordance with claim 1 wherein said circuit including said transducer is tuned to respond sharply to frequencies within the range 90 to 100 kilocycles per second, and to be substantially unresponsive to other frequencies.

7. The combination in accordance with claim 1 wherein said transducer is rigidly mounted to the inner face of the base of said housing, and said means for coupling said transducer in ultrasonic transfer relation with an external surface of said pipe includes a metal strap constructed to be secured around the periphery of said pipe section for coupling the base of said housing to said external pipe surface.

8. The combination in accordance with claim 7 wherein said means for coupling said transducer includes a curvilinear portion contiguous with the base of said transducer housing, and constructed to substantially conform to the contour of said pipe section.

9. The combination in accordance with claim 8 wherein said curvilinear portion comprises a metal member.

10. The combination in accordance with claim 8 wherein said curvilinear portion at least partially comprises nonmetal material.

11. The combination in accordance with claim 1 wherein said means for utilizing the said output current comprises an indicating meter.

12. The combination in accordance with claim 1 wherein said means for utilizing said output current comprises recording means.

13. The combination in accordance with claim 1 wherein said means for utilizing said output current comprises a relay for actuating additional functions including valve means for controlling the fluid flow in said pipe.

14. The combination in accordance with claim 1 wherein said means for utilizing said output current comprises an alarm device.

15. The method of monitoring fluid flow in a pipe which comprises the steps of
    securing a transducer in ultrasonic energy translation with an external surface of said pipe section whereby said transducer is responsive to the signal generated by the shearing action of fluid flowing in said pipe,
    frequency-selectively amplifying and filtering the output signal derived from said transducer to produce a substantially uniform response profile within a preselected frequency range, while rejecting signals below said frequency range,
    integrating the steady state component of said amplified signal while rejecting transients,
    and utilizing the said integrated output.

16. The method in accordance with claim 15 wherein said preselected frequency range has a low cutoff point between about 200 cycles per second and about 40 kilocycles, and a fairly uniform response therefrom to a high frequency cutoff point of at least about 100 kilocycles.

17. The method in accordance with claim 16 wherein the signal output from the transducer is passed through at least one preamplification step in which the high frequency signals within said range are amplified, and the low frequency signals are bypassed,
    the output from said preamplification step is passed through an additional high pass filtering step,
    the output from said filtering step is further amplified by receiving and selectively amplifying the high frequencies and bypassing the low frequencies,
    the steady state component of the output from said further amplification step is integrated in a charging circuit having a time constant between about one-half second and 2 seconds for rejecting transients,
    and the integrated output is utilized for actuating additional circuitry.

18. The method in accordance with claim 15 wherein said preselected frequency range is between about 90 and 100 kilocycles, and wherein said circuit is sharply tuned to said range.

19. The method in accordance with claim 15 which comprises the step of coupling said transducer in ultrasonic energy translation with a pipe surface devoid of specialized external fittings for said coupling by securing a metal strap around the periphery of said pipe to hold the transducer in close relation to said pipe surface.

20. The method in accordance with claim 19 which comprises contouring the bottom of the transducer housing to fit the pipe surface.

21. The method in accordance with claim 15 wherein said integrated output is utilized to perform at least one of a plurality of functions including indicating, recording, controlling the fluid flow in said pipe, and actuating alarm and safety devices.

UNITED STATES PATENT OFFICE
CERTIFICATE OF CORRECTION

Patent No. 3,580,092      Dated May 25, 1971

Inventor(s) Thomas J. Scarpa

It is certified that error appears in the above-identified patent and that said Letters Patent are hereby corrected as shown below:

Column 5, line 16, "resistors" should read -- transistors --.

Signed and sealed this 30th day of November 1971.

(SEAL)
Attest:

EDWARD M. FLETCHER, JR.      ROBERT GOTTSCHALK
Attesting Officer      Acting Commissioner of Patents